United States Patent [19]
Yang et al.

[11] Patent Number: 5,702,745
[45] Date of Patent: Dec. 30, 1997

[54] PROCESS FOR MAKING SHELF-STABLE, READY-TO-EAT RICE

[75] Inventors: Angel A. Yang; Loren L. Druz, both of Yorba Linda; Terry Berman, Orange, all of Calif.

[73] Assignee: Hunt-Wesson, Inc., Fullerton, Calif.

[21] Appl. No.: 669,625

[22] Filed: Jun. 24, 1996

[51] Int. Cl.$^6$ .................. A23B 9/00; H05B 6/00
[52] U.S. Cl. .............. 426/242; 426/268; 426/309; 426/321; 426/462; 426/521
[58] Field of Search .................. 426/242, 268, 426/309, 321, 462, 511, 521, 626

[56] References Cited

U.S. PATENT DOCUMENTS

| | | | |
|---|---|---|---|
| 2,187,718 | 1/1940 | Wilbur | 426/626 |
| 2,890,957 | 6/1959 | Seltzer | 426/461 |
| 3,083,102 | 3/1963 | Carcassone-Leduc | 426/461 |
| 3,647,486 | 3/1972 | Tollefson et al. | 426/618 |
| 3,879,566 | 4/1975 | Cox et al. | 426/309 |
| 4,734,291 | 3/1988 | Raffensperger | 426/325 |
| 4,741,911 | 5/1988 | McIntyre et al. | 426/325 |
| 4,761,297 | 8/1988 | Sugisawa et al. | 426/309 |
| 4,789,553 | 12/1988 | McIntyre et al. | 426/325 |
| 4,810,511 | 3/1989 | Velupillai et al. | 426/462 |
| 5,130,153 | 7/1992 | McIlroy et al. | 426/242 |

*Primary Examiner*—George Yeung
*Attorney, Agent, or Firm*—Pretty, Schroeder & Poplawski

[57] ABSTRACT

Disclosed is a method for preparing shelf-stable, ready-to-eat rice products. The method involves coating pregelatinized rice grains with an emulsifier. A food acid and glucono-delta-lactone are then added to the coated rice to lower the pH to 4.6 or less. The rice is then thermally treated at a temperature and for a time sufficient for sterilization. The resulting products have the same or superior texture, appearance, and flavor when compared to other commercially produced, shelf-stable, ready-to-each rice products.

26 Claims, No Drawings

PROCESS FOR MAKING SHELF-STABLE, READY-TO-EAT RICE

BACKGROUND OF THE INVENTION

1. Field of the Invention

This invention relates to the chemical arts. In particular, it relates to a process for making ready-to-eat rice.

2. Discussion of the Related Art

Shelf-stable, ready-m-eat food products are of ever-increasing popularity. Consumers appreciate the convenience of purchasing precooked food products and later enjoying the products, with or without reheating. Such products must be processed to provide both long term stability against changes in their character and, of course, stability against microbial contamination.

To ensure that the food products have an adequate shelf-life and do not spoil before they, are ultimately consumed, the products must not only be cooked, but they must also be sterilized. Sterilization generally involves subjecting the food products to elevated temperatures, pressures or both, for example, by steam retorting.

Rice has become an important source of carbohydrates in the American diet. Aside from its nutritional value, its popularity has risen, in large part, because of its mild taste and pleasing appearance and mouthfeel. Unfortunately, it has proved difficult to prepare commercially acceptable, shelf stable, ready-to-eat rice products. Conventional processes generally result in excessive discoloration of the rice, physical breakdown of the rice grain, and an adverse effect on its flavor.

Accordingly, there has existed a definite need for a simple and effective method for preparing shelf-stable, ready-to-eat rice. There has existed a still further need for such a process that preserves the texture, appearance, and flavor of freshly prepared rice, while protecting against microbial contamination. The present invention satisfies these and other needs and provides further related advantages.

SUMMARY OF THE INVENTION

Now in accordance with the invention, there has been found a method for preparing shelf-stable, ready-to-eat rice products having substantially the same texture, appearance, and flavor as their freshly prepared counterparts. The method involves, first, coating pregelatinized rice grains with an emulsifier. A combination of a food acid and glucono-delta-lactone are subsequently added to the thus coated rice to lower the pH to 4.6 or less. The rice is then thermally treated at a temperature and for a time sufficient for sterilization.

In preferred embodiments, the pregelatinized rice is prepared by parboiling or precooking, the emulsifier is a monoglyceride, a diglyceride or a mixture thereof, and the food acid is phosphoric acid. Also, in preferred embodiments, the food acid and the glucono-delta-lactone are added to the rice as part of an acidified brine and the resulting low-pH product is thermally treated by retort sterilization techniques, such as by steam, steam and air, or hot water retorting.

Detailed Descriptions of the Preferred Embodiments

The process in accordance with the invention is useful with pregelatinized rice, including rice that has been precooked or parboiled by conventional methods. Representative rice includes long-grain rice, such as Patna, and medium-grain rice, such as Zenith, as well as short grain, pearl and brown rice. It is an advantage of the process in accordance with the invention that the time required for thermal sterilization of the pregelatinized flee is significantly less than the time required for other rice and the resulting shelf stable, ready-to eat-products have exceptional texture, appearance, and flavor.

Pregelatinized rice grains are initially coated with an emulsifier. Any emulsifier that is compatible with an edible product and, in particular, is compatible with the rice is useful. Representative emulsifiers include sodium stearyl fumarate, calcium stearyl-2-lactylate, and mono- and di-glycerides, such as glyceral monostearate, monooleate, monopalmitate, distearate, dioleate, and dipalmitate. Monoglycerides, diglycerides and mixtures thereof are preferred.

The rice grains are coated by spraying or mixing the rice with a carrier containing the emulsifier to ensure separation of individual rice kernels. Any carrier that is compatible with the rice product and the emulsifier can be used. Representative emulsifiers include butter and animal fats, such as lard. Preferred carriers include vegetable oils, such as soybean, corn, peanut, palm, cottonseed, coconut, walnut, sesame, safflower, sunflower seed, or canola oils. Still other suitable carriers include sucrose polyesters of long chain fatty acids (olestra) and other polyol polyesters of fatty acids, such as described in U.S. Pat. No. 3,600,186 to Mattson and U.S. Pat. No. 4,005,196 to Jandacek, edible oils containing at least 10% medium chain triglycerides; such as are described in U.S. Pat. No. 4,863,753 to Hunter, and mixed triglycerides made from medium and long chain saturated and/or unsaturated fatty acids. It is also possible to use mixtures of two or more different carriers. The ratio of carrier to emulsifier is typically from about 1:1 to about 20:1, preferably about 1:1 to about 5:1, based on weight.

An aqueous mixture of glucano-delta-lactone (GDL) and a food acid is then combined with the rice. Representative food acids include acetic acid, fumaric acid, malic acid, tartaric acid, lactic acid, ascorbic acid, isoascorbic acid, succinic acid, adipic acid, citric acid, hydrochloric acid, and phosphoric acid, with phosphoric acid being preferred. The concentration of the GDL and food acid is such that the pH of the rice is lowered to 4.6 or less, preferably from about 4.3 to about 4.6. It is an advantage of the inventive process that, even at these low pH's, the rice does not develop an undesirable sour flavor.

In preferred embodiments, the GDL and food acid are added to an mount of brine solution sufficient to facilitate the subsequent thermal treatment. In some embodiments, the brine will additionally contain flavorants used to make specialty rice, such as Spanish rice, Chinese rice, curried rice, Italian rice, Mexican rice, and Cajun rice. In a preferred embodiment, the acidified brine is included with the rice in the container to be thermally processed. Also, in some embodiments, sauces, such as sweet and sour or butter sauces, are added to the rice, after the acidified brine has been mixed in, but before the rice is sterilized.

The rice is then thermally sterilized. A preferred method for such thermal sterilization is retorting, i.e., hermetically sealing the rice and acidified water or brine in a container, then heating in a pressure vessel with pure steam or a mixture of steam and air or hot water to an elevated temperature. For processing rice in a stationary or an agitating retort, the temperature range is preferably from about 220° to about 270° F, more preferably from about 220° to about 240° F. For stationary retorting, the rice is preferably treated for less than about one hour, more preferably for less than about one-half hour. For rotary retorting, the rice is preferably treated for less than about thirty minutes, more preferably for less than about fifteen minutes.

Other thermal sterilization techniques include ohmic and microwave heating. Still another suitable thermal processing technique is aseptic processing. In aseptic processing, a commercially sterilized product is filled into a presterilized container and then aseptically and hermetically sealed with a presterilized closure in an atmosphere free of microorganisms. The particular method and conditions for a particular product will depend on a number of factors, including the size of the container. The method and conditions will be readily determinable by one skilled in the art without undue experimentation.

It is an advantage of the process in accordance with the invention, that the rice may be thermally treated at lower temperatures and for a shorter period of time than is otherwise possible. Such relatively mild thermal processing conditions produce a shelf-stable, ready-to-eat rice having a texture, appearance and flavor as good as or superior to other commercially produced, shelf-stable, ready-to-eat rice products. While the invention has been described in detail with reference to certain preferred embodiments thereof, it will be understood that modifications and variations are within the spirit and scope of that which is described and claimed. For example, ready-to-eat is be construed broadly to include any product that is heat sterilized to ensure shelf-stability.

We claim:

1. A method for making a shelf-stable, ready-to-eat rice product comprising the steps of:
    coating pregelatinized rice grains with an emulsifier;
    adding a sufficient amount of a combination of a food acid and glucono delta-lactone to the thus coated rice, grains to lower the pH to 4.6 or less; and
    thermally treating the resulting low-pH rice grains at a temperature and for a time sufficient to sterilize the rice.

2. The method in accordance with claim 1, wherein the rice grains are parboiled rice grains or precooked rice grains.

3. The method in accordance with claim 2, wherein the emulsifier is a monoglyceride, a diglyceride or mixture thereof.

4. The method in accordance with claim 2, wherein the rice grains are coated using a carrier containing the emulsifier.

5. The method in accordance with claim 4, wherein the carrier is a vegetable oil.

6. The method in accordance with claim 5, wherein the ratio of carrier to emulsifier is from about 1:1 to about 20:1, based on weight.

7. The method in accordance with claim 2, wherein the food acid is acetic acid, fumaric acid, malic acid, tartaric acid, lactic acid, ascorbic acid, isoascorbic acid, succinic acid, adipic acid, citric acid, hydrochloric acid, or phosphoric acid.

8. The method in accordance with claim 7, wherein the food acid is phosphoric acid.

9. The method in accordance with claim 2, further comprising the food acid and the glucano-delta-lactone are added as part of an acidified brine.

10. The method in accordance with claim 2, wherein the rice grains are thermally treated by steam retorting, steam and air retorting, hot water retorting, ohmic heating or microwave heating.

11. The method in accordance with claim 10, wherein the rice grains are thermally treated by retorting.

12. The method in accordance with claim 11, wherein the rice grains are thermally treated by steam retorting.

13. The method in accordance with claim 12, wherein the rice grains are thermally treated at a temperature of from about 220° to about 240° F.

14. The method in accordance with claim 13, wherein the rice grains are thermally treated for less than about thirty minutes.

15. The method in accordance with claim 14, wherein the rice grains are thermally treated for less than about fifteen minutes.

16. A method for making, shelf-stable, ready-to-eat rice comprising the steps of:
    coating parboiled or precooked rice grains with an emulsifier selected from monoglycerides, diglycerides or mixtures thereof;
    adding a combination of phosphoric acid and glucono-delta-lactone to the thus coated rice grains in an amount sufficient to lower the pH to 4.6 or less; and
    thermally treating the resulting low-pH rice grains using a high pressure process at a temperature and for a time sufficient to sterilize the rice grains.

17. The method in accordance with claim 16, wherein the rice grains are coated using a vegetable oil carrier containing the emulsifier.

18. The method in accordance with claim 17, wherein the ratio of carrier to emulsifier is from about 1:1 to about 20:1, based on volume.

19. The method in accordance with claim 16, further comprising the phosphoric acid and the glucono-delta-lactone are added as part of an acidified brine.

20. The method in accordance with claim 18, wherein the rice grains are thermally treated by steam retorting, steam and air retorting, hot water retorting, ohmic heating or microwave heating.

21. The method in accordance with claim 19, wherein the rice grains are thermally treated by steam retorting.

22. The method in accordance with claim 21, wherein the rice grains are thermally treated at a temperature of from about 220° to about 240° F.

23. The method in accordance with claim 22, wherein the rice grains are thermally treated for less than about thirty minutes.

24. The method in accordance with claim 23, wherein the rice grains are thermally treated for less than about fifteen minutes.

25. A method for making shelf-stable, ready-to-eat rice comprising the steps of:
    coating parboiled or precooked rice grains with an emulsifier selected from monoglycerides, diglycerides or mixtures thereof;
    adding an acidified brine containing phosphoric acid and glucono-delta-lactone to the thus coated rice grains, in an amount sufficient to lower the pH to 4.6 or less; and
    thermally treating the resulting low-pH rice grains using steam retorting, steam and air retorting, hot water retorting, ohmic heating or microwave heating at a temperature and for a time sufficient to sterilize the rice grains.

26. The method in accordance with claim 19, wherein the rice grains are coated using a vegetable oil carrier containing the emulsifier in a ratio of carrier to emulsifier of from about 1:1 to about 20:1, based on weight.

* * * * *